(12) United States Patent
Nicotera et al.

(10) Patent No.: US 9,653,737 B2
(45) Date of Patent: May 16, 2017

(54) CO-DEPOSITION OF CONDUCTIVE MATERIAL AT THE DIFFUSION MEDIA/PLATE INTERFACE

(75) Inventors: Paul D. Nicotera, Honeoye Falls, NY (US); Chunxin Ji, Penfield, NY (US); Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1255 days.

(21) Appl. No.: 12/699,968

(22) Filed: Feb. 4, 2010

(65) Prior Publication Data

US 2011/0189580 A1 Aug. 4, 2011

(51) Int. Cl.
*H01M 8/10* (2016.01)
*H01M 4/88* (2006.01)

(52) U.S. Cl.
CPC ............... *H01M 4/88* (2013.01); *H01M 8/10* (2013.01); *Y02E 60/521* (2013.01)

(58) Field of Classification Search
None
See application file for complete search history.

(56) References Cited

U.S. PATENT DOCUMENTS

| 7,285,257 | B2 * | 10/2007 | Walker et al. | 423/245.1 |
| 2006/0088760 | A1 * | 4/2006 | Lee | H01M 8/0206 429/129 |
| 2007/0238006 | A1 * | 10/2007 | Vyas | H01M 8/0206 429/450 |
| 2008/0248275 | A1 * | 10/2008 | Jang | B82Y 30/00 428/220 |
| 2009/0151847 | A1 * | 6/2009 | Zhamu | B29C 43/28 156/47 |
| 2010/0159303 | A1 * | 6/2010 | Rock | H01M 8/0232 429/507 |
| 2011/0143262 | A1 * | 6/2011 | Fultz | H01M 4/8807 429/513 |

(Continued)

OTHER PUBLICATIONS

Chen et al., Microscopicla study of carbon/carbon composites obtained by chemical vapor infiltration of 0 degree/0 degree/90 degree/90 degree carbon fiber preforms, Carbon 43, 2005, pp. 3088-3098.*

(Continued)

*Primary Examiner* — Barbara Gilliam
*Assistant Examiner* — Angela Martin
(74) *Attorney, Agent, or Firm* — Quinn IP Law (57) ABSTRACT

A method of depositing a conductive material is described. The method includes: providing a plate selected from anode plates, cathode plates, bipolar plates, or combinations thereof, wherein the plate includes gas flow channels; providing a diffusion media in contact with the gas flow channel side of the plate to form an assembly; introducing a gaseous precursor of the conductive material into the assembly using a chemical vapor infiltration process; infiltrating the gaseous precursor into the diffusion media and gas flow channels of the plates; and depositing a coating of the conductive material on the diffusion media, the gas flow channels of the plate, or both. An assembly having a CVI conductive coating and a fuel cell incorporating the diffusion media having the CVI conductive coating are also described.

13 Claims, 6 Drawing Sheets

(56) References Cited

U.S. PATENT DOCUMENTS

2011/0229823 A1* 9/2011 Rock .................. H01M 8/0232
                                                        430/315
2012/0219881 A1* 8/2012 Sivarajan ...................... 429/505

OTHER PUBLICATIONS

Chen et al., Microscopical Study of Carbon/Carbon Composites Obtained by Chemical Vapor Infilration of 0 degree/0 degree/90 degree/90 degree Carbon Fiber Prevorms, Carbon 43, 2005, pp. 3088-3098.

Tang et al., Effects of Carrier Gas on Densification of Porous Carbon-Carbon Composites During Chemical Vapor Infiltration, vol. 10, No. 1, J. Cent. South Univ. Technol., Mar. 2003, Article ID 1005-9784, 2004, pp. 1-6.

Tang et al., Albation Properties of C/C Composites With Various Needled Performs Prepared by Isothermal Chemical Vapor Infiltration, vol. 14, No. 1., J. Cent. South Univ. Technol., (2007) 01-0013-06, DOI 10.1007/s11771-007-0003-6, Jan. 2007, pp. 1-6.

* cited by examiner

CO-DEPOSITION OF CONDUCTIVE MATERIAL AT THE DIFFUSION MEDIA/PLATE INTERFACE

FIELD OF THE INVENTION

The present invention relates to fuel cells, and methods of making them.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides. The catalyst coated PEM is positioned between a pair of gas diffusion media layers (DM), and a cathode plate and an anode plate (or bipolar plates (BPP)) are placed outside the gas diffusion media layers. The components are compressed to form the fuel cell.

Fuel cell stack operation at very high current density (for example, about 2 A/cm$^2$), high electrical contact resistance between the bipolar plate and the gas diffusion media or between the gas diffusion media and the electrodes generally results in unacceptably large ohmic losses (electrical resistance). Although fuel cells rarely operate at higher current density (for example, greater than about 1 to about 1.5 A/cm$^2$), it is necessary to be able to achieve these higher power generation capabilities with minimal ohmic losses. The voltage loss in each cell due to ohmic resistance increases with current density (ohmic voltage loss=total ohmic resistance×current density). Consequently, the higher the current density, the greater the benefit of reducing interfacial resistance.

What constitutes unacceptably high ohmic losses in a particular application depends on the cost trade-off between ohmic loss and compression level. The level of ohmic loss in each cell determines the maximum current density achievable, and the associated active area required, to produce a desired amount of power at a given voltage and total number of cells. The higher the ohmic losses are, the lower the maximum current density can be for a given cell voltage, and thus the larger the required cell active area must be to achieve a desired power. On the other hand, there is an additional cost associated with increasing stack compression to achieve sufficiently low ohmic loss (for a given cell active area).

Currently, low electrical resistance at the interface between a steel plate and the diffusion media can be achieved by using a highly conductive, thin coating on the plate. The coating materials can include gold, carbon graphite, or other electrically conductive materials that can be quickly deposited in a controlled, nanometer-scale thickness and are compatible in the fuel cell operating environment. The use of conductive adhesives, such as silver-filled epoxy and solders, has also been tried to reduce electrical resistance and mechanically bond the diffusion media to the plates.

One problem with these approaches has been the cost. Also, the adhesives are susceptible to degradation over time, particularly in humid environments, such as a fuel cell, resulting in increased resistance over time.

Therefore, there is a need for improved diffusion media, coatings, or materials at the interface between the diffusion media and plate, as well as for methods of making them.

SUMMARY OF THE INVENTION

In one embodiment, a method of depositing a conductive material is described. The method includes: providing a plate selected from anode plates, cathode plates, bipolar plates, or combinations thereof, wherein the plate includes gas flow channels; providing a diffusion media in contact with a gas flow channel side of the plate to form an assembly; introducing a gaseous precursor of the conductive material into the assembly using a chemical vapor infiltration (CVI) process; infiltrating the gaseous precursor into the diffusion media and gas flow channels of the plates; and depositing a coating of the conductive material on the diffusion media, the gas flow channels of the plate, or both.

Another aspect of the invention is an assembly having a conductive coating. The assembly includes: a diffusion media; a plate selected from selected from anode plates, cathode plates, bipolar plates, or combinations thereof, wherein the plate includes gas flow channels; and a CVI conductive coating on the diffusion media, the gas flow channels of the plate, or both.

Another aspect of the invention is a fuel cell. The fuel cell includes: a polymer membrane; a pair of catalyst layers on opposite sides of the polymer membrane; a pair of gas diffusion media adjacent to the pair of catalyst layers on opposite sides of the polymer membrane, the diffusion media having a CVI conductive coating; and a pair of plates adjacent to the pair of diffusion media, the pair of plates on opposite sides of the polymer membrane, the pair of plates selected from cathode plates, anode plates, or bipolar plates, wherein the plates have gas flow channels.

DETAILED DESCRIPTION OF THE INVENTION

A controlled chemical vapor infiltration (CVI) process is performed to coat a conductive material onto the DM carbon fibers, the plate surface, or both simultaneously while the two components are situated as they would be in the fuel cell stack. The plates can be anode plates, cathode plates, or bipolar plates. Anode plates and cathode plates have flow channels on one side, while bipolar plates have flow channels on both sides. For convenience, the following discussion will refer to bipolar plates.

The process can be used to coat/bond entire stacks of alternating DM and BPP parts. The components could be stacked in sequence as they would be arranged in the final fuel cell stack, excluding the MEA. Optionally, there could be a highly porous separator layer, or placeholder, at each MEA position. For example, an assembly could include endplate, DM, separator, DM, BPP, DM, separator, DM, BPP, . . . DM, separator, DM, BPP, DM, separator, DM, endplate.

The stacked DM and BPP components can be coated either uncompressed or while compressed. The method can be optimized to minimize cost by balancing the added cost of stack compression with the cost saving of reduced electrical resistance.

This coating process is expected to increase the contact area between the DM and BPP in order to reduce the electrical resistance. The reduction in electrical contact resistance between the DM and BPP should increase overall fuel cell performance, especially at high current density. It could also mechanically bond the DM and BPP together, which could simplify stack assembly.

The CVI process is generally described in Chen et al., "Microscopical study of carbon/carbon composites obtained by chemical vapor infiltration of 0°/0°/90°/90° carbon fiber performs," Carbon 43 (2005) 3088-3098; and Tang, et al., "Effects of carrier gas on densification of porous carbon-carbon composites during chemical vapor infiltration," Vol. 10, No. 1, J. Cent. South Univ. Technol., March 2003, Article ID 1005-9784 (2003) 01-0007-06, which are incorporated herein by reference. The isothermal CVI process is generally described in Tang, et al., "Ablation properties of C/C composites with various needled performs prepared by isothermal chemical vapor infiltration," Vol. 14, No. 1, J. Cent. South Univ. Technol., (2007)01-0013-06, DOI 10.1007/s11771-007-0003-6, January 2007, which is incorporated herein by reference.

Figure 1A:
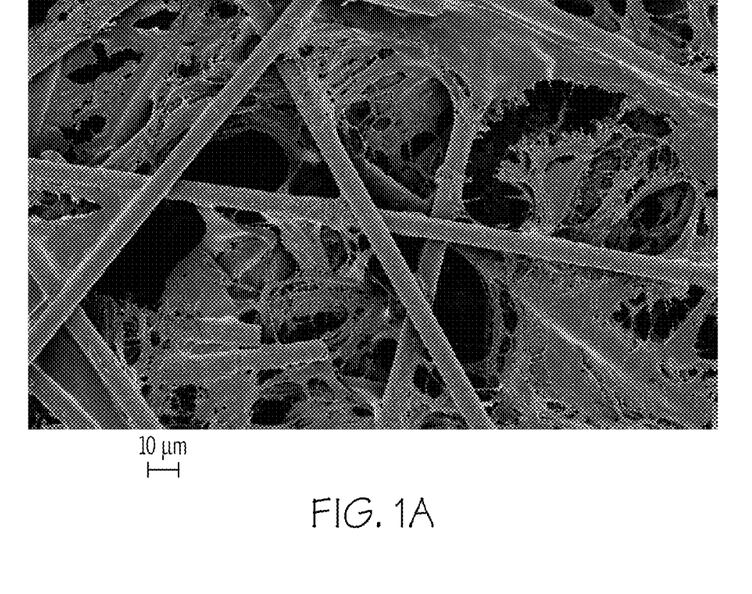
FIGS. 1A-B are SEM images of a carbon fiber substrate with no CVI treatment (500× and 2500×).
Figure 1B:
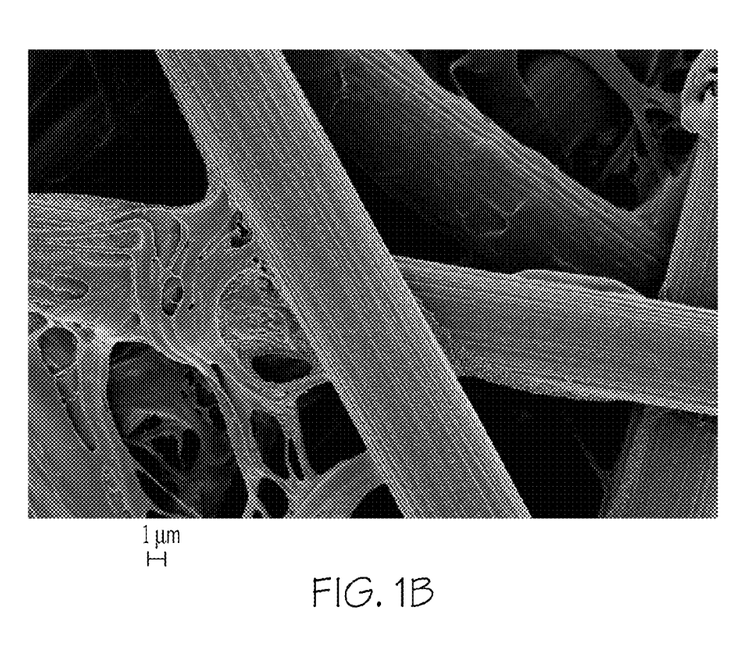

FIGS. 1A-B shows a carbon fiber substrate with no CVI coating at two magnifications (500× and 2500×). As with most wet-laid carbon fiber nonwovens, there is a carbonized resin present that binds the fibers together. The images show the very small direct fiber-to-fiber micro-contact area in these typical DM structures, and how carbonized binder (probably with lower electrical conductivity and more tenuous connectivity than CVI carbon) is needed to increase the inter-fiber conduction area.

Figure 2A:
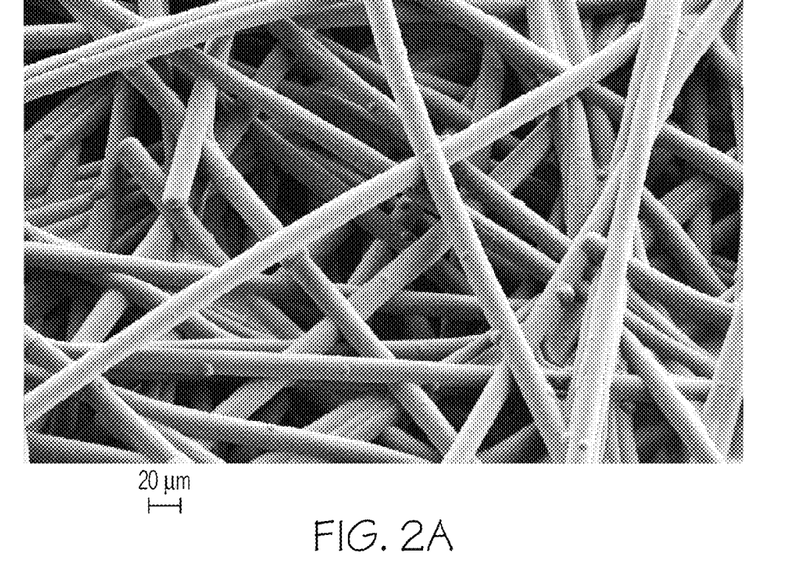
FIGS. 2A-C are SEM image of a CVI carbon-coated fiber paper DM sample 1 (200×, 1000×, and 2450×).
Figure 2B:
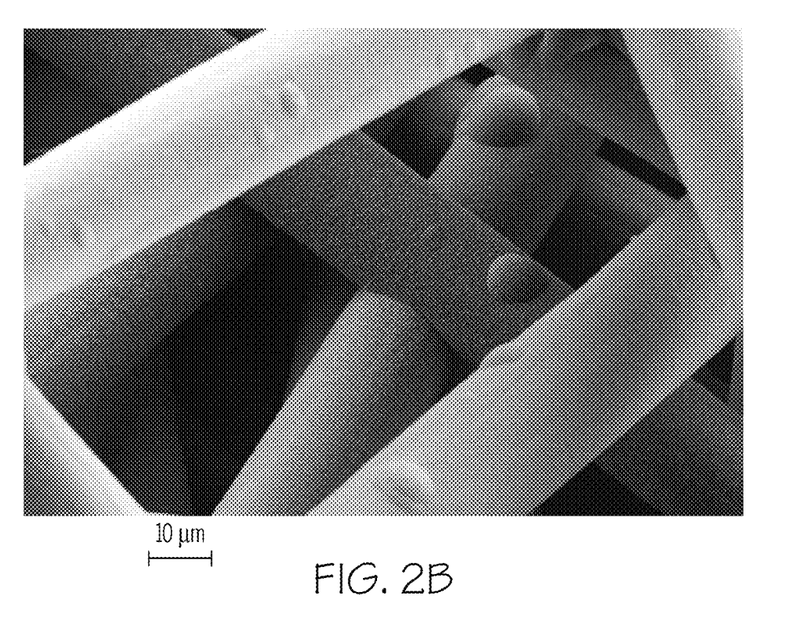
Figure 2C:
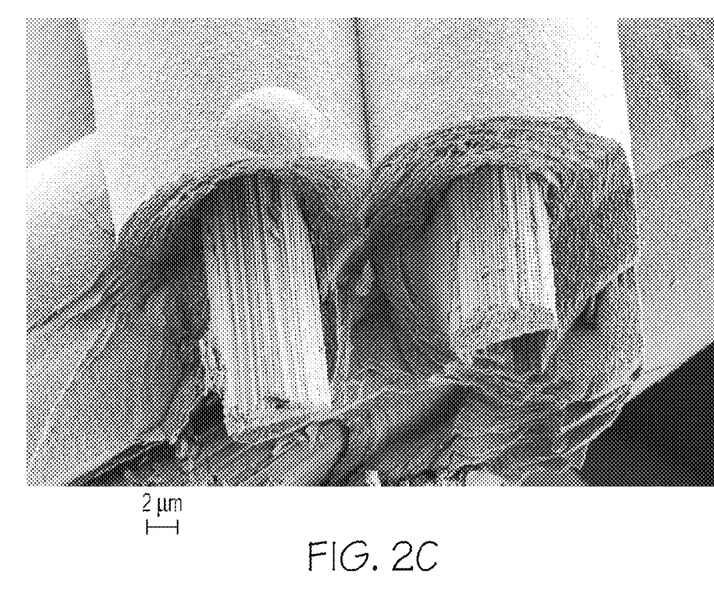
Figure 3:
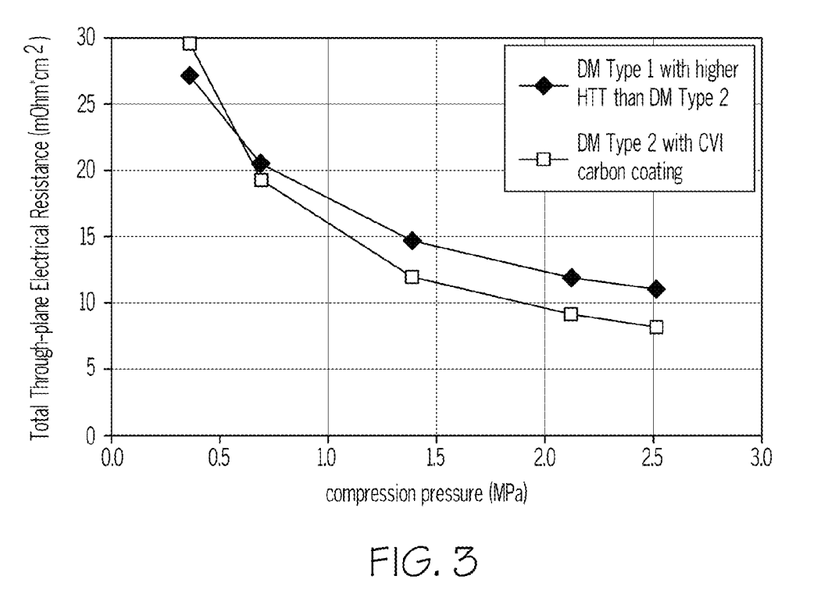
FIG. 3 is a plot of total through-plane electrical resistance for two different DM types loose-laid against gold-coated steel coupons.

FIGS. 2A-C show a layer of conductive carbon about 5-10 microns thick deposited on a carbon fiber nonwoven at three magnifications (200×, 1000×, and 2450×). This material, later called "DM Type 2", is included as an example of the CVI process applied to one of the fuel cell components of interest. The CVI technology may be similarly applied to the other components, and using similar techniques at other facilities, as those demonstrated by the example material. The through-plane electrical resistance of the CVI carbon coated DM which was loose-laid against a flat gold-coated stainless steel coupon was measured. The CVI carbon coated DM showed lower total through-plane ohmic loss (including bulk and contact resistance) when compared to a traditional carbon fiber DM without the carbon coating, as seen in FIG. 3. FIG. 3 shows the total through-plane electrical resistance measurements for two different diffusion media types tested with gold-coated stainless steel coupons. For each test, two layers of the DM were loose-laid, with one layer on each side, against a 1-mm thick, gold-coated stainless steel coupon. Voltage drop was measured between gold-coated copper plates compressing this DM/coupon/DM stack, while 6.45 Amps of direct current were passed in a parallel circuit through the plates and sample stack. The DM and coupon area was 2.54 cm×2.54 cm, so the current density through the samples was 1 A/cm$^2$. HTT indicates heat treatment temperature, and is directly correlated to DM carbon fiber substrate electrical conductivity.

It should be noted that the carbon fiber substrates are different for the two DM with and without the CVI carbon coating. "DM Type 1" is MRC105 carbon fiber paper manufactured by Mitsubishi Rayon Company, Ltd., which experiences a relatively high maximum heat treatment temperature, perhaps as high as 2000° C. or greater, and exhibits some level of graphitic content that increases electrical conductivity. The CVI carbon coated "DM Type 2", fabricated at Central South University in Changsha, China, is heat treated to a maximum temperature of about 1000° C., which occurs during the CVI deposition process. The CVI conductively coated DM demonstrates lower electrical resistance, even with a lower temperature and thus cheaper heat treatment, than a typical graphitized DM substrate.

The deposition of the carbon coating at the intersection points between fibers within the DM substrate increases the micro-contact area between fibers. This suggests that co-deposition of the carbon coating onto the DM and BPP while they are in contact may also increase the average micro-contact area of the existing contact points between the DM and BPP.

Compressing the DM against the BPP and depositing the conductive coating onto micro-contact areas between the DM and BPP will increase the micro-contact area of a larger number of contact points and further reduce interfacial resistance.

The stack can be compressed while the CVI process is being performed, if desired. The equipment typically used to apply a load to a stack of cells can be used to apply a load to the stack in preparation for the CVI deposition process.

Figure 4:
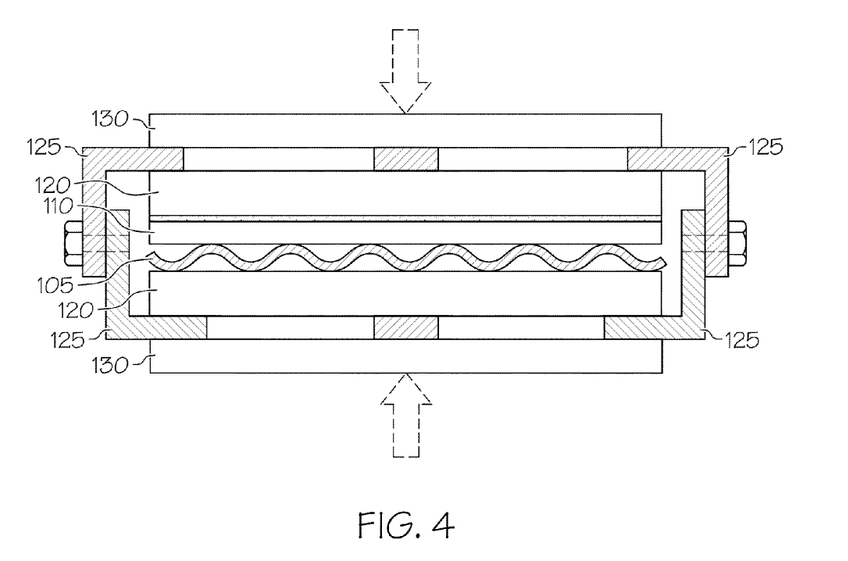
FIG. 4 is a diagrammatic, cross-section side-view of a DM and BPP prepared for deposition of the conductive material according to one embodiment of the invention.
Figure 5:
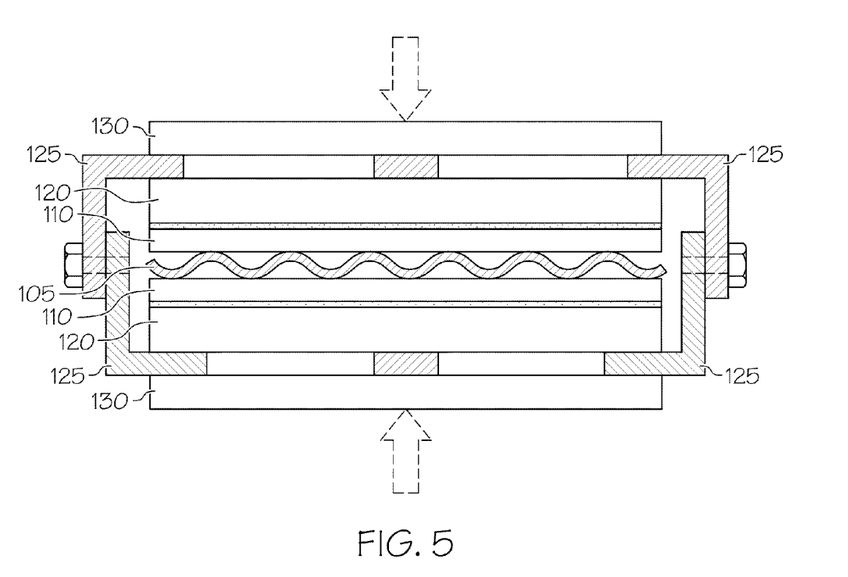
FIG. 5 is a diagrammatic, cross-section side view of a DM, BPP, and DM assembly prepared for deposition of the conductive material according to one embodiment of the invention.
Figure 6:
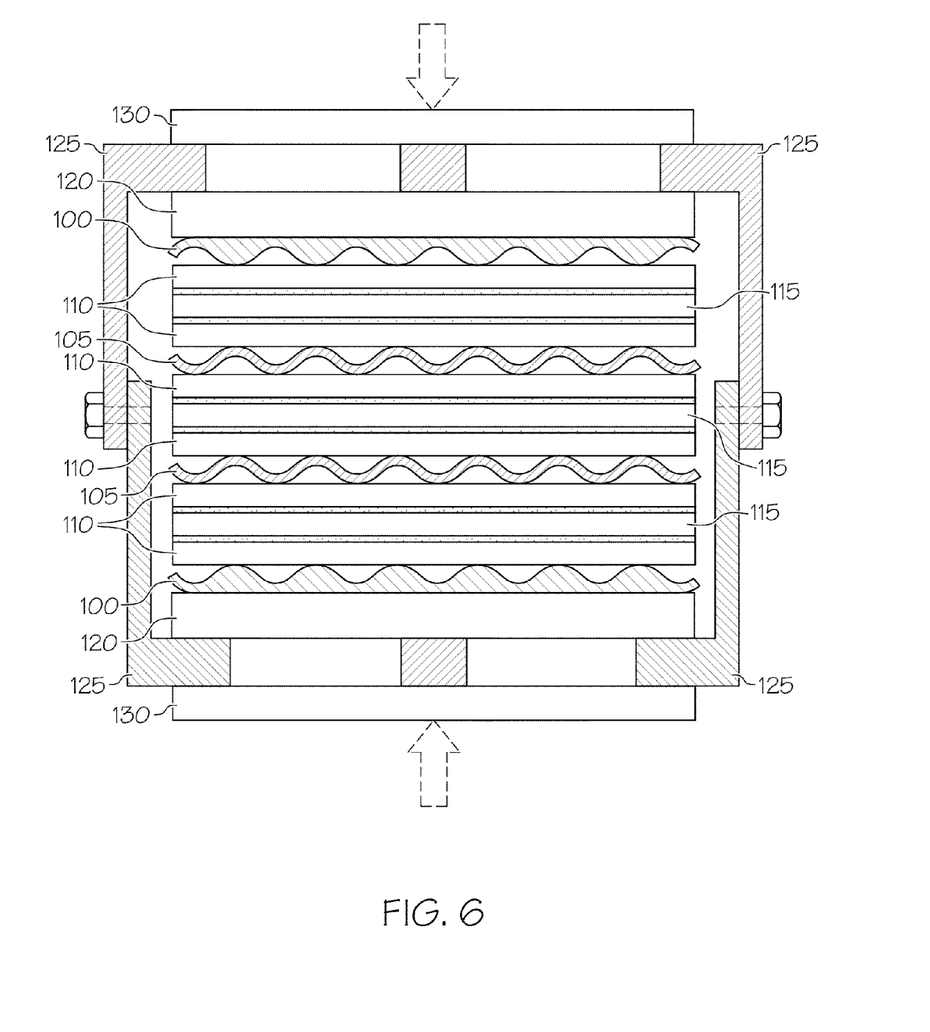
FIG. 6 is a diagrammatic, cross-section side-view of a stack of DM and BPP prepared for deposition of the conductive material according to one embodiment of the invention.

FIGS. 4-6 depict possible configurations of how the DM and BPP can be compressed using a standard compression fixture, then after the side plates are secured in their compressed positions, the solid endplates can be removed to enable precursor gas infiltration during the subsequent coating process. Note that these diagrams are not to scale.

FIG. 4 is a schematic showing a cross-section side-view of a single DM and BPP to be conductively coated. There is a bipolar plate 105 with an adjacent diffusion media 110 (with optional microporous layers and fluoropolymer wetproofing). There are a pair of rigid, porous compression distribution mesh 120. Compression fixtures 125 can be attached to the stack, and rigid compression distribution plates 130 applied to the ends. After the stack has been compressed, the compression fixtures 125 are secured. The rigid compression distribution plates 130 could then be removed if desired, so that once the stack is placed in the CVI chamber, the precursor gas may infiltrate more readily through the compressed stack.

FIG. 5 is a schematic showing a cross-section side-view of a BPP with a pair of DM on opposite sides to be conductively coated. There is a bipolar plate 105 with adjacent diffusion media 110 (with optional microporous layers and fluoropolymer wetproofing) on both sides. There are a pair of rigid, porous compression distribution mesh

120. Compression fixtures 125 can be attached to the stack, and rigid compression distribution plates 130 applied to the ends. After the stack has been compressed, the compression fixtures 125 are secured. The rigid compression distribution plates 130 could then be removed if desired.

FIG. 6 is a schematic showing a cross-section side-view of the stack of DM and BPP components to be conductively coated. There are endplates 100 on either end of the stack with two bipolar plates 105 between the endplates 100. Adjacent to the endplates 100 (one side) and bipolar plates (on both sides) are diffusion media 110 (with optional microporous layers and fluoropolymer wetproofing). The diffusion media 110 are separated by optional highly porous separator layers 115. Outside the endplates 100, are a pair of rigid, porous compression distribution mesh 120. Compression fixtures 125 can be attached to the stack, and rigid compression distribution plates 130 applied to the ends. After the stack has been compressed, the compression fixtures 125 are secured. The rigid compression distribution plates 130 could then be removed if desired.

The CVI process allows the precursor to penetrate into the pores of the sample so that a uniform coating can be deposited. During the deposition process, by controlling the precursor gas inlet and outlet locations relative to the stack assembly in the deposition chamber, the precursor gas can enter each assembly (set of DM and BPP) through the headers and ports designed for anode and cathode reactant flows. The precursor species follow the flow channels and access the BPP-DM interfaces in each cell. The temperature and diffusivity of the precursor gas affects the flow rate. Establishing a pressure differential between the inlet and outlet may also help to provide adequate flow, although this may affect the uniformity of the coating.

A highly porous separator plate could be inserted between the DMs in each repeating DM/BPP/DM assembly to provide adequate flow of the precursor gas to each component, if desired. If only one assembly (DM/Anode, DM/Cathode, or DM/BPP/DM) is being coated, the separator plate is unnecessary. However, for a stack of assemblies, the separator plates can be helpful to obtain a more uniform deposition and to minimize process time.

Suitable conductive coatings which can be deposited by CVI include, but are not limited to, different phases of carbon, titanium nitride, and titanium oxynitride. The gaseous precursor for the coating should have a high enough diffusivity that it can be deposited throughout the entire BPP and DM interfacial area, in the absence of a pressure differential along the flow channels and within the DM internal pores during the CVI process. By placing separator plates between each DM/BPP/DM assembly, controlling precursor pressure and temperature, as well as carefully locating the assembly or stack of assemblies within the deposition chamber, the desired coating uniformity and thickness can be achieved with a variety of precursor gas species having different diffusivities.

Suitable gaseous precursors for depositing carbon include, but are not limited to, methane, ethane, propane, acetylene, propylene, or mixtures thereof. The gaseous precursor can be carried in a carrier stream if desired. Suitable carrier streams include, but are not limited to, nitrogen, argon, hydrogen, or combinations thereof.

The conductive coating should also be electrically conductive. The coating materials mentioned previously, have ideal electrical conductivities of 167 S/cm (graphite) and $4.0 \times 10^4$ S/cm (titanium nitride). Although these values are lower than those of noble metals, such as gold ($4.5 \times 10^5$ S/cm), they have been shown to enable reduced through-plane electronic resistance when coated appropriately on the BPP and DM surfaces.

Figure 7:
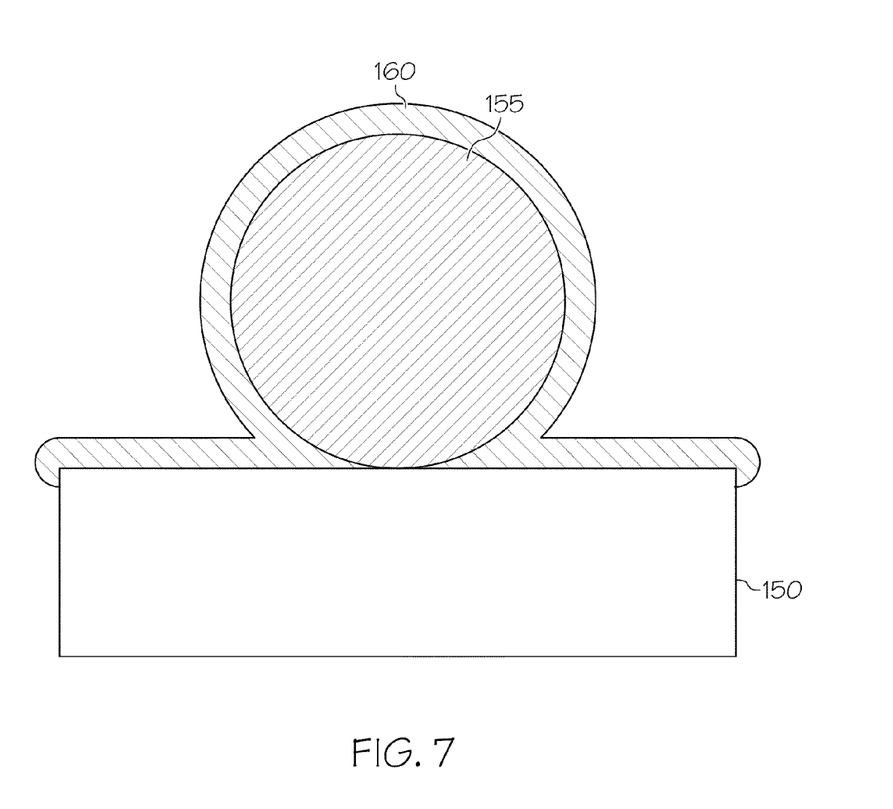
FIG. 7 is a diagrammatic, cross-section side view at the microscopic level showing the conductive material distribution at the interface of a DM carbon fiber and BPP surface due to simultaneous deposition onto both components as described in the invention.

FIG. 7 is an illustration of a desirable conductive coating configuration at the DM-BPP interface. This arrangement may be achieved by simultaneously depositing the conductive material onto the mated BPP 150 and DM 155 components. With such an interface, the introduction of a conductive coating 160 does not alter the already present electrical conduction pathways between the DM carbon fiber and BPP contact points. However, the conductive coating may contribute additional electrical conduction pathways between the DM and BPP by increasing each contact point's interfacial area. So long as the coating material has some intrinsic electrical conductivity, it is expected that such a treatment will decrease the total through-plane electrical resistance.

Another important feature of the conductive coating is durability in the fuel cell operating environment, which the previously mentioned coating materials are expected to possess.

The thickness of the conductive coating depends in part on what is being coated. The conductive coating has a generally uniform thickness. The coating is typically less than about 10 microns thick. However, it can be greater than 10 microns, if desired. It can be in the range of about 0.5 micron to about 10 microns, or about 0.5 to about 5 microns, if desired. It can be less than 0.5 microns, if desired. If the coating is only on the BPP, then the coating will desirably achieve uniformly low contact resistance with the DM, provide any required corrosion protection for the plate material, maintain adequate reactant and product water transport through the flow channels, and minimize deposition cost and process time, for example in the thickness range of about 0.5 micron. If the coating is being deposited on both the DM and BPP, the coating should be thick enough in order to maximize the average micro-contact area and the potential to achieve a mechanical bond at the DM-BPP interface, but not so thick that the mass transport in the DM becomes inadequate (for example in the range of about 5 microns). Reasonable coating time (cost) should also be maintained.

The coating process is typically performed without the MEA being present because the catalyst in the electrode might be coated at the same time. The fuel cell would not operate if the infiltrated conductive coating fills the pores of the electrode (or the microporous layer of the DM).

After the conductive coating step is completed and the stack is cooled, a mechanized process may be employed to separate the pairs of DM for each cell and insert MEA's, preferably maintaining compression on the two sections of the stack while separated.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of depositing a conductive material to provide a uniformly conductive surface across an assembly of fuel cell components, the method comprising:
   providing a plate selected from anode plates, cathode plates, bipolar plates, or combinations thereof, wherein the plate comprises a side comprising gas flow channels;
   providing a diffusion media;
   mating a surface of the diffusion media with the gas flow channel side of the plate to form an assembly comprising an interfacial area between the diffusion media and plate, said interfacial area comprising electrically conductive contact points; and
   simultaneously depositing a conductive material to the mated diffusion media and plate by infiltrating the interfacial area with conductive material using a chemical vapor infiltration (CVI) process, thereby providing a uniformly conductive surface across the assembly.

2. The method of claim 1, wherein the plate is a bipolar plate, and there are two diffusion media on opposite sides of the bipolar plate.

3. The method of claim 1, wherein there are at least two assemblies.

4. The method of claim 1, wherein the conductive material is selected from the group consisting essentially of carbon, titanium nitride, and titanium oxynitride, and combinations thereof.

5. The method of claim 1, wherein the CVI process comprises infiltration of a gaseous precursor selected from the group consisting essentially of methane, ethane, propane, acetylene, propylene, and mixtures thereof.

6. The method of claim 5, wherein the gaseous precursor is carried in a carrier stream selected from the group consisting essentially of nitrogen, argon, hydrogen, and combinations thereof.

7. The method of claim 1, further comprising compressing the assembly prior to depositing, wherein compressing comprises placing the diffusion media and the plates between a pair of endplates and applying compression to the pair of endplates.

8. The method of claim 1, wherein the chemical vapor infiltration process comprises an isothermal chemical vapor infiltration process.

9. The method of claim 1, wherein the conductive material forms a coating having a thickness of less than about 10 microns.

10. The method of claim 9, wherein the coating has a thickness from about 0.5 microns to about 5 microns.

11. The method of claim 7, wherein simultaneously depositing the conductive material surface across the compressed assembly increases an interfacial area of the electrically conductive contact points.

12. A method comprising:
   providing a plate and a diffusion media, the plate selected from the group consisting essentially of anode plates, cathode plates, bipolar plates, and combinations thereof, the plate including a side defining gas flow channels therein, the diffusion media having a surface;
   mating the side with the surface to thereby produce a mated assembly, the mated assembly including an interfacial area disposed between the diffusion media and the plate, the interfacial area including electrically conductive contact points; and
   after mating, simultaneously depositing a conductive material onto the diffusion media and the plate so that the conductive material infiltrates the interfacial area using a chemical vapor infiltration process to thereby produce a generally uniformly conductive surface across the mated assembly.

13. An assembly comprising:
   a plate selected from the group consisting essentially of anode plates, cathode plates, bipolar plates, and combinations thereof, the plate including a side defining gas flow channels therein;
   a diffusion media having a surface mated with the side to thereby produce a mated assembly, the mated assembly including an interfacial area disposed between the diffusion media and the plate, the interfacial area including electrically conductive contact points; and
   a conductive material, disposed between the diffusion media and the plate such that the conductive material infiltrates the interfacial area using a chemical vapor infiltration process,
   wherein the mated assembly has a generally uniformly conductive surface.

* * * * *